(12) United States Patent
Yavuz et al.

(10) Patent No.: US 9,614,868 B2
(45) Date of Patent: Apr. 4, 2017

(54) SYSTEM AND METHOD FOR MITIGATION OF DENIAL OF SERVICE ATTACKS IN NETWORKED COMPUTING SYSTEMS

(71) Applicant: Robert Bosch GmbH, Stuttgart (DE)

(72) Inventors: Attila Altay Yavuz, Pittsburgh, PA (US); Jorge Guajardo Merchan, Pittsburgh, PA (US); Shalabh Jain, College Park, MD (US)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 14/213,079

(22) Filed: Mar. 14, 2014

(65) Prior Publication Data

US 2014/0365775 A1    Dec. 11, 2014

Related U.S. Application Data

(60) Provisional application No. 61/789,745, filed on Mar. 15, 2013.

(51) Int. Cl.
*H04L 29/06*     (2006.01)
*H04L 9/14*      (2006.01)
*H04L 9/32*      (2006.01)

(52) U.S. Cl.
CPC ............ *H04L 63/1458* (2013.01); *H04L 9/14* (2013.01); *H04L 9/3247* (2013.01); *H04L 9/3297* (2013.01); *H04L 63/061* (2013.01); *H04L 63/08* (2013.01); *H04L 63/123* (2013.01); *H04L 63/0435* (2013.01); *H04L 63/0442* (2013.01)

(58) Field of Classification Search
CPC ... H04L 63/1458; H04L 63/08; H04L 63/061; H04L 9/14; H04L 9/3247; H04L 9/3297; H04L 63/0442; H04L 63/123

USPC ........................................... 713/171
See application file for complete search history.

(56) References Cited

U.S. PATENT DOCUMENTS

| | | | |
|---|---|---|---|
| 7,197,639 B1 | 3/2007 | Juels et al. | |
| 7,337,324 B2 * | 2/2008 | Benaloh | G06F 21/31 713/168 |
| 8,112,483 B1 | 2/2012 | Emigh et al. | |

(Continued)

OTHER PUBLICATIONS

Laurens, Vicky et al., Requirements for Client Puzzles to Defeat the Denial of Service and the Distributed Denial of Service Attacks, The International Arab Journal of Information Technology, Oct. 2006, vol. 3, No. 4.

(Continued)

*Primary Examiner* — Mahfuzur Rahman
*Assistant Examiner* — Narciso Victoria
(74) *Attorney, Agent, or Firm* — Maginot Moore & Beck LLP (57) ABSTRACT

In a method of network communication that mitigates denial of service attacks, a server broadcasts cryptographic puzzles with certain time intervals, where each puzzle is only valid for the given time interval. A client receives the puzzle, generates a solution for the puzzle, and sends a network request to the server along with the solution of the puzzle. The server verifies the puzzle solution. If the puzzle solution is valid and received within a designated validity time period, then the server processes the request of the client. The server generates the puzzle and transmits the puzzle to the client before the client generates a request for services from the server.

18 Claims, 3 Drawing Sheets

(56) References Cited

U.S. PATENT DOCUMENTS

| | | | |
|---|---|---|---|
| 8,171,562 B2 | 5/2012 | Feng | |
| 2005/0050364 A1 | 3/2005 | Feng | |
| 2007/0157300 A1 | 7/2007 | Sivaradjane et al. | |
| 2008/0320554 A1* | 12/2008 | Baker | G06F 21/31 726/2 |
| 2009/0217386 A1* | 8/2009 | Schneider | H04L 9/3271 726/30 |
| 2010/0234083 A1* | 9/2010 | Hagiwara | A63F 13/10 463/9 |
| 2011/0116381 A1* | 5/2011 | Nikander | H04L 67/2819 370/236 |
| 2012/0174196 A1 | 7/2012 | Bhogavilli et al. | |
| 2014/0137219 A1* | 5/2014 | Castro | H04L 63/08 726/6 |

OTHER PUBLICATIONS

Chan, Ellick M. et al., Using Rhythmic Nonces for Puzzle-Based DoS Resistance, CSAW'08, Oct. 31, 2008, Fairfax, Virginia.
Waters, Brent et al., New Client Puzzle Outsourcing Techniques for DoS Resistance, CCS '04, Oct. 25-29, 2004, Washington, D.C.
Gao, Yi et al., Efficient Trapdoor Based Client Puzzle Against DoS Attacks, published at least as early as Mar. 15, 2012.
Sankar, Aditya et al., Capturing Indoor Scenes with Smartphones, UIST'12, Oct. 7-10, 2012, Cambridge, Massachusetts.
Perrig, Adrian et al., The TESLA Broadcast Authentication Protocol, published at least as early as Mar. 15, 2012.
International Search Report and Written Opinion corresponding to PCT Application No. PCT/US2014/029018, mailed Jun. 27, 2014 (13 pages).

* cited by examiner

SYSTEM AND METHOD FOR MITIGATION OF DENIAL OF SERVICE ATTACKS IN NETWORKED COMPUTING SYSTEMS

CLAIM OF PRIORITY

The application claims priority to U.S. Provisional Application No. 61/789,745, which is entitled "System And Method For Mitigation Of Denial Of Service Attacks In Networked Computing Systems," and was filed on Mar. 15, 2013, the entire contents of which are hereby incorporated by reference herein.

FIELD

This disclosure relates generally to the fields of network communication, and, more particularly, to systems and methods for mitigating denial of service attacks against one or more networked computing systems.

BACKGROUND

Client cryptographic puzzles, or more simply "puzzles," have been proposed as a mechanism to defend against resource exhaustion Denial of Service (DoS) attacks in network protocols, such as key exchange protocols. Cryptographic puzzles counterbalance computational usage between client and server machines. The client receives a cryptographic puzzle and is forced to perform computations to solve the puzzle before the client can successfully utilize resources on the server. The server ensures that the client spends sufficient resources before the server commits resources to serving requests from the client. In particular, an adversary who wishes to attack a server with connection requests will have to solve a large number of puzzles. Cryptographic puzzles have been used in computer networks to reduce or eliminate junk emails (i.e. spam), and to mitigate the effects of Denial-of-Service (DoS) attacks in network protocols.

In general, cryptographic puzzles have a high computational solution cost, are stateless, have a low computational generation cost, have a low computational solution verification cost, and have flexible puzzle complexity to mitigate DoS attacks with different levels of sophistication. The computational cost to solve a puzzle for a client should be much higher than the computational cost to generate the puzzle and verify the correctness of a puzzle solution for a defending server. The puzzles must be stateless, meaning that no clients/attackers are able to predict the puzzles that are received from a defending server. Thus, clients and attackers are unable to compute puzzle solutions in advance. While solving a puzzle includes sufficient computational complexity to reduce the rate of requests for the clients and potential attackers, the generation of a puzzle should be computationally inexpensive for the defending server. Complying with this requirement prevents the process of puzzle construction from becoming a new target of DoS attacks. In such attacks, a malicious client may flood a defending server with a large amount of initial connection requests from spoofed addresses to deceive the server into consuming considerable resource for puzzle construction. An attack scenario can be imagined in which an attacker sends a large number of bogus solutions to a defending server in order to exhaust resources on the server by performing the verification process. If the cost of puzzle verification on the server is much more expensive than that of generating random solutions on a client, the verification process is definitely possible to be another DoS attack target. Additionally, the complexity of the puzzles is adjusted flexibly according to the strength of an attack.

Various types of cryptographic puzzles are known to the art that satisfy some or all of the above properties. A representative example of such cryptographic puzzles is a hash-based reversal puzzle. In a hash-based reversal puzzle, the server constructs cryptographic puzzles using a hash function. The clients need to calculate a reverse one-way hash value of the puzzle. In this technique, the server is able to adjust the difficulty level of the cryptographic puzzle by increasing or decreasing the number of hidden bits of the pre-image sent to clients in the puzzle. The pre-image bits are bits of the original data that the server hashes to generate the puzzle. The full pre-image is the solution to the puzzle, and the server reduces or increases the computational complexity of the puzzle by increasing or reducing, respectively, the number of bits in the pre-image that the client receives with the puzzle. The client performs a brute-force search to find missing bits of pre-image whose output is given by hashing each pattern until matching the answer. To verify the solution, the server needs to perform only a single hash operation. In another puzzle scheme that is known to the art, the puzzle generation requires only a single hash. Given part of the pre-image and the length (n) of zero bits at the beginning of the hashed output, the client performs a brute-force search to find a matching solution.

Figure 1:
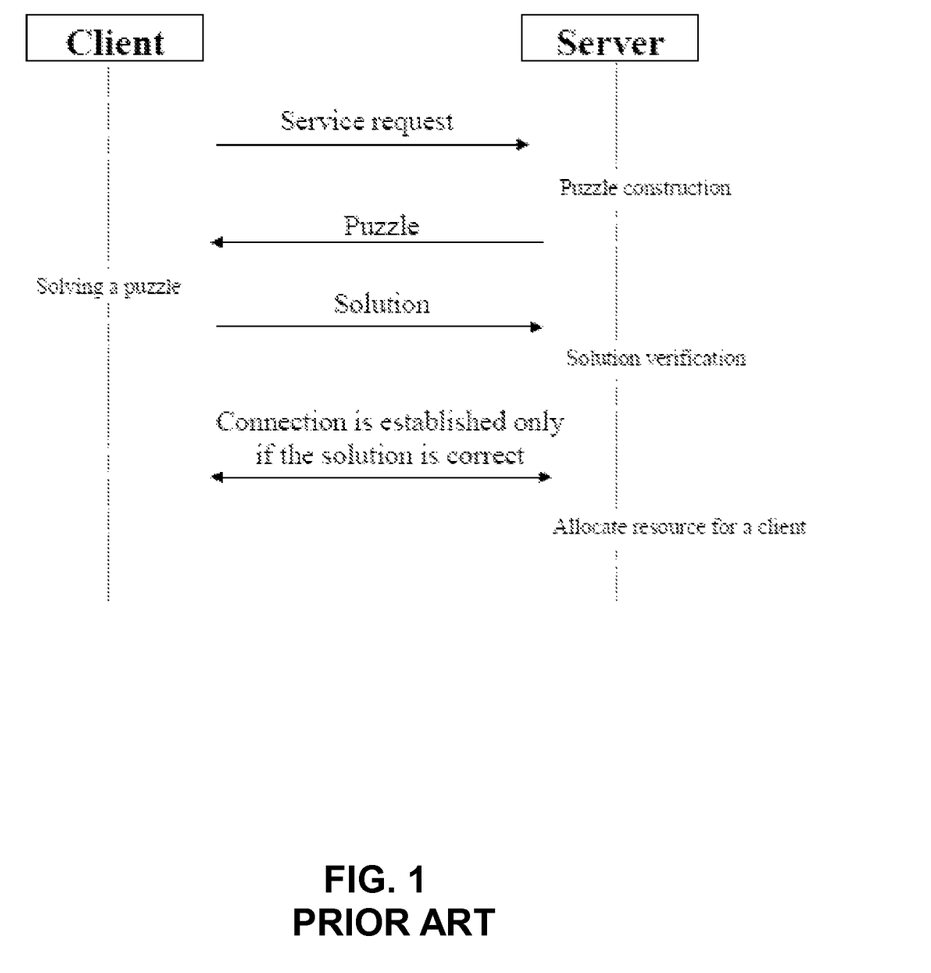
FIG. 1 is a diagram of a prior-art process for using cryptographic puzzles for clients in a network computing environment to mitigate denial of service attacks where puzzles are sent to clients in response to receiving client requests for communication with the server.

FIG. 1 depicts a prior-art client-puzzle framework that implements the traditional client-puzzle mechanisms that are described above. In FIG. 1, the client first initiates the mechanism by sending a service request to the server. The server generates a puzzle using a function x←PuzzleGen(ts, validity_time, difficulty, k, ID). This function generally takes a timestamp ts denoting when the puzzle is generated and transmitted, a validity_time information stating how long the puzzle will remain valid, a difficulty parameter, a private key k and the identity of the server ID as the input. It returns a cryptographic puzzle x satisfying the desirable properties described above (hash-based reversal or other types of cryptographic puzzles may satisfy these properties). Note that for notational simplicity, FIG. 1 depicts function interfaces without including all of their input or output parameters as required (e.g., x←PuzzleGen(.) or only PuzzleGen(.)). The client solves the puzzle by executing a transformation x'←PuzzleSolve(x, difficulty, ID). Function PuzzleSolve(.) depends on the type of puzzle construction (e.g., hash-based, Diffie-Hellman (DH) based, squaring based, etc.). The client must send x' to the server before the puzzle expires. The server receives the solution x' from the client on time T and verifies the correctness of the solution with a function {0,1}←PuzzleVer(x', T, validity_time, difficulty, k, ID). That is, if the puzzle solution x' is valid and solved within a designated time interval, PuzzleVer(.) returns 1 meaning valid; otherwise, it returns 0 meaning invalid. The server allocates the resource for the client if PuzzleVer(.) returns 1.

As described above, the existing cryptographic puzzle systems require the client to contact the server to receive a puzzle. In some networked systems, the requirement for a server to transmit the puzzle to the client immediately before the client establishes a network communication session with the server leads to unacceptable increases in network latency and operating overhead. Puzzles, however, are still useful in mitigating denial of service attacks. Consequently, improvements to network systems that provide greater flexibility to network communication while mitigating denial of service attacks would be beneficial.

SUMMARY

Denial-of-Service (DoS) attacks are one of the critical security threats for various systems and applications (e.g., web-servers, sensors). The embodiments described herein include methods and systems to mitigate DoS attacks. The embodiments include a DoS countermeasure framework, which is suitable for broadcast-oriented applications. In the DoS countermeasure framework, the server (i.e., the service provider) broadcasts client-puzzles with a certain validity time. That is to say, the server initiates the DoS countermeasure protocol. In the framework, the server uses any broadcast medium such as wireless medium or public storage entities. In one embodiment, the framework is implemented using puzzle generation functions, such as hash-reversal, Diffie-Hellman based, and squaring based functions, in a generic manner. The proposed DoS protection mechanism presents an alternative approach to the traditional client-puzzle mechanisms that is beneficial for the server as the client must first solve the puzzle and then contact the server with the correct solution.

In one embodiment, a method for mitigation of denial of service attacks in a network has been developed. The method includes generating with a processor in a server computing device a first plurality of puzzles, transmitting with the processor and a network device in the server computing device the first plurality of puzzles through a data network to a plurality of client computing devices, receiving with the processor and the network device in the server computing device a request from one client computing device in the plurality of client computing devices that includes a solution to one puzzle in the first plurality of puzzles, the request from the one client computing device being received without a communication from the one client computing device requesting a puzzle, verifying with the processor in the server computing device correctness of the solution to the one puzzle from the one client computing device with reference to data corresponding to the one puzzle stored in a memory in the server computing device, and continuing to process the request with the processor in the server computing device only in response to verification that the solution from the one client computing device is correct.

In another embodiment, a server computing device that mitigates denial of service attacks in a network has been developed. The server computing device includes a memory, a network device configured to send and receive data with a plurality of external computing systems through a data network, and a processor operatively connected to the memory and the network device. The processor is configured to generate a first plurality of puzzles, transmit the first plurality of puzzles through the data network to a plurality of client computing devices, receive a request from one client computing device in the plurality of client computing devices that includes a solution to one puzzle in the first plurality of puzzles, the request from the one client computing device being received without a communication from the one client computing device to request a puzzle, verify correctness of the solution to the one puzzle from the one client computing device with reference to data corresponding to the one puzzle stored in the memory, and continue to process the request only in response to verification that the solution from the one client computing device is correct.

DETAILED DESCRIPTION

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

Figure 2:
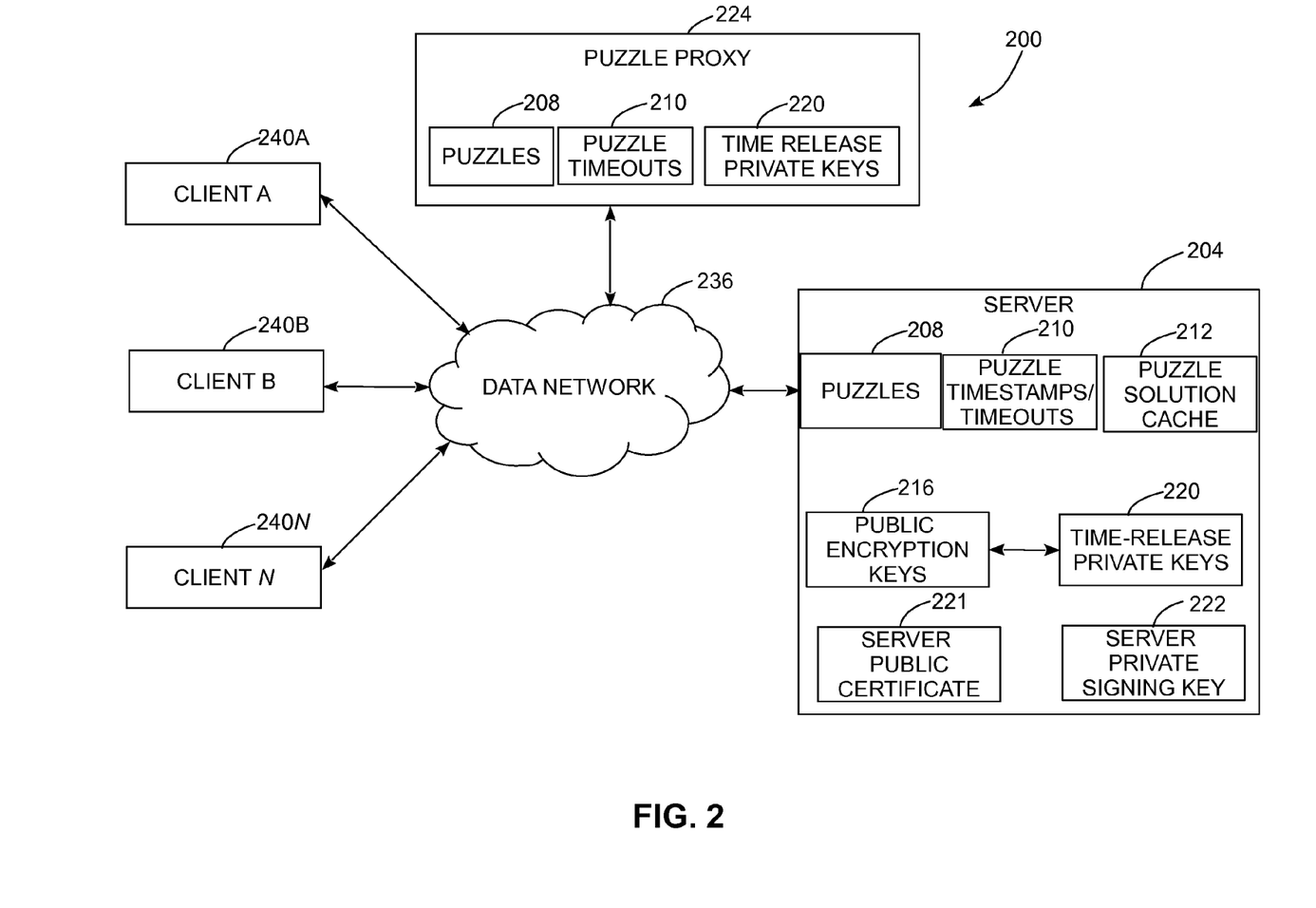
FIG. 2 is a schematic diagram of a network system where a server transmits cryptographic puzzles to clients before the clients generate specific requests for communication with the server.

FIG. 2 depicts a networked system 200 that includes a server computing device (server) 204, puzzle proxy server 224, and a plurality of client computing devices (clients) 240A-240N. In the system 200, a data network 236 provides communication between the server 204, puzzle proxy server 224, and the clients 240A-240N. In one embodiment, the data network 236 is a wireless network with broadcast or multicast operating modes that enable the server 204 to send messages to some or all of the clients 240A-240N concurrently. One embodiment of a wireless data network is an ad-hoc network where wireless network devices in each of the server 204 or puzzle proxy server 224 and clients 240A-240N transmit data in a broadcast manner to each of the other nodes, while other wireless networks include repeaters and other intermediate wireless network devices. In a "broadcast network" configuration, the nodes 240A-240N each receive transmissions from the server 204. While the wireless network described above is one form of a broadcast network, other network configurations including Ethernet broadcast hubs and data networks that use shared communication media are broadcast networks as well. In other embodiments of the data network 236, including wired data network embodiments and data networks that include both wired and wireless communication, a "multicast" data network enables the server 204 to transmit data a portion of two or more of the clients 240A-240N concurrently, while a "unicast" data network enables individual communication between two of computing devices that access the data network 236.

The server 204, puzzle proxy server 224, and clients 240A-240N each include one or more digital processing devices, digital memory storage devices, and software applications to implement communication protocols using the data network 236. Each of the server 204, puzzle proxy server 224, and the clients 240A-240N includes one or more network devices that enable each of the respective computing devices to transmit and receive data through the data network 236. Examples of suitable network devices include, but are not limited to, Ethernet adapters for wired networking, wireless transceivers for the 802.11 or Bluetooth families of protocols in wireless local area networks (WLANs), and wireless transceivers that are suitable for 3G, 4G other wireless wide area network (WWAN) protocols.

The server 204 hardware and software components generate client cryptographic puzzles and verify the solutions that clients generate for the puzzles. The hardware and software components in the puzzle proxy server 224 are configured to store puzzles that are received from the server 204 and to provide puzzles to the clients 240A-240N. The hardware and software components in the clients 240A-240N are configured to generate solutions to puzzles. In the system 200, the server 204 is configured to provide a network service in response to receiving legitimate service requests from the clients 240A-240N. Examples of network services include, but are not limited to, web services, voice and video services, file transfer and data storage services, and the like. In one system configuration, the server 204 and clients 240A-240N are part of an embedded wireless sensor and control network.

During operation, the server 204 generates a predetermined set of puzzles 208 and transmits the puzzles through the data network 236. The server 204 generates puzzles via PuzzleGen(.) function and broadcasts these puzzles through the data network 236 in embodiments of the data network 236 that are broadcast networks. The server receives requests from the clients 240A-240N along with puzzle solutions. Depending on the result of the puzzle verification, the server grants or denies access to services in response to requests from the clients. In one configuration, the puzzles are broadcast over the broadcast network 236, and the clients 240A-240N receive puzzles before generating a request for network resources. The server 204 generates each one of the puzzles 208 with a limited lifetime. In one configuration, the server 204 stores puzzle timestamp data 210 in association with each one of the puzzles 208. The server 204 stores the list of currently valid puzzles 208 in association with the timestamp data 210, and deletes invalid puzzles from the server memory after the difference between the current time and the timestamp for each puzzle exceeds a predetermined timeout threshold. If none of the clients 240A-240N solve the puzzle and transmit the results to the server 204 prior to expiration of the timestamp 210, then the server 204 deletes the corresponding puzzle 208. The server 204 also optionally stores solutions to the puzzles 212. The server 204 generates and transmits new puzzles as older puzzles timeout to provide timely puzzles for the clients 240A-240N.

While FIG. 2 depicts an embodiment where the server 204 stores puzzles 208, timestamp and time validity data 210 and puzzle solutions 212 in a memory, other embodiments omit some or all of these items from memory or store some of the data using space-efficient storage techniques. For example, the puzzles 208 do not need to be stored in the server memory after the puzzles have been distributed to the clients 240A-240N or the puzzle proxy server 224. Additionally, the puzzle solution data can be compressed using lossless compression techniques or using lossy compression techniques such as using Bloom filters or simply truncating the solution and only comparing the answer from the client to the remaining portion of the solution (e.g. truncating a 160 bit puzzle solution to only include 80 bits). The use of lossy compression reduces the size of the stored solution data, but introduces a statistical chance that the server 204 will accept incorrect solutions to the puzzles. However, in many practical embodiments the likelihood of a malicious client guessing an answer that is not correct but that appears to be correct due to the lossy compression is relatively low, so the memory versus accuracy tradeoff can be acceptable in some embodiments.

In other embodiments, the server 204 generates a cryptographic signature for the puzzle data and associated timeout metadata before distributing the puzzles to the clients 240A-240N. A client retransmits the signed puzzle data and timeout data in addition to sending the puzzle solution, so the server 204 does not need to retain the puzzle, puzzle solution, or timeout information since the server can verify that these data are authentic using the cryptographic signature.

In addition to generating the puzzles with limited lifetimes, the server 204 generates cryptographic signatures for each puzzle along with a timestamp and validity time for each puzzle, and optionally additional data related to the puzzle. The server 204 uses a public-private key pair including a public certificate 221 and a private signing key 222, where the private signing key 222 is known only to the server 204 and the certificate 221 is known to each of the clients 240A-240N. The server 204 uses the private signing key 222 to generate signatures for each set of puzzle data to enable the clients 240A-240N to verify that the puzzles are authentic puzzles that were generated by the server 204 and not by a malicious party. Additionally, in some embodiments the clients 240A-240N copy the original puzzle data and signature that is received from the server 204 in a client request. The server 204 uses the public certificate 221 to verify that the client is sending a solution to a valid puzzle and that the puzzle in question is "fresh", which is to say that the client solved the puzzle and generated the request within the predetermined validity time after the puzzle was made available to the client.

During operation, if one of the clients 240A-240N solves one of the puzzles 208 and transmits the correct solution to the server 204, then the server 204 deletes the corresponding puzzle 208 from memory so that the puzzle is only valid for a single network connection. In one embodiment, the server 204 stores a cache of puzzle solutions 212 in association with the valid puzzles 208 to enable easy verification of puzzle solutions. In another embodiment, the server 204 performs a verification process to ensure that a solution from one of the clients 240A-240N corresponds to the valid solution for one of the puzzles 208.

In one operating mode, the clients 240A-240N access a service offered by the server 204. In a broadcast network embodiment, a client listens to a broadcast medium, such as a wireless medium or other shared communication medium, in the data network 236 to observe puzzles that the server 204 broadcasts to the clients 240A-240N. Once the server 204 broadcasts a puzzle, the client must solve it before the validity of the puzzle expires. The client then sends a request to the server along with the solution of this puzzle. If the protocol is followed correctly, the client gains access to the service offered by the server 204.

The server 204 transmits generated cryptographic puzzles before the clients 240A-240N generate network requests that require a valid puzzle solution to receive a response from the server 204. In some embodiments, the server 204 transmits the puzzles to the puzzle proxy server 224. The puzzle proxy server 224 stores the valid puzzles 208 until the puzzles 208 expire based on the puzzle timestamp and timeout data 210. The timestamps correspond to when the puzzles are made publicly available, such as through broadcast transmission to the clients 240A-240N. The timeouts correspond to predetermined periods of validity from the time at which the clients 240A-240N have access to the puzzles until when the puzzles are no longer considered valid. The timestamps and timeouts prevent malicious clients from solving a large number of puzzles over time and then sending a large number of purportedly valid requests to the server 204 in a short period of time.

The clients 240A-240N request the cryptographic puzzles from the puzzle proxy server 224 and solve the puzzles prior to requesting services from the server 204. In one configuration, the puzzle proxy server 224 limits the maximum rate at which the clients 240A-240N receive puzzles to prevent exhaustion of the valid puzzles before the server 204 generates additional puzzles. The puzzle proxy server 224 is a public storage entity, which is to say that the server 204 does not necessarily exercise control or place trust in the puzzle proxy server 224. In one embodiment, the puzzle proxy server 224 includes a distributed network cluster or distributed online service with a high degree of redundancy and network bandwidth that is difficult for an attacker to disable with a standard DoS attack. Thus, the puzzle proxy server 224 is resistant to DoS attacks and continues to provide puzzles to the clients 240A-240N.

As described above, the server 204 generates puzzles 208 before the clients 240A-240N communicate with the server 204 to establish a network connection or otherwise request service from the server 204. During some periods of operation, the server 204 has few active requests from the clients 240A-240N, and the server 204 devotes unused computing resources to generating new puzzles 208. The generated puzzles are stockpiled for later periods of depleted resources in the server 204. In the system 200, the server 204 encrypts some of the puzzles 208 using a series of temporary use public encryption keys 216. The server 204 transmits the encrypted puzzles through the data network 236 to the clients 240A-240N and optionally to the puzzle proxy server 224 for temporary storage. At a predetermined time, the server 204 transmits the corresponding private keys 220 for the public keys that are used to encrypt the puzzles. The clients 240A-240N or the puzzle proxy server 224 then decrypt the puzzles using the private keys 220. The server 204 transmits the private key 220 at a predetermined time to "unlock" the encrypted puzzles and make the previously encrypted puzzles available for use by the clients 240A-240N. In another embodiment, the server 204 uses a single symmetric key to encrypt the puzzles using an existing encryption scheme and the server 204 transmits the symmetric key at a predetermined time to enable decryption of the puzzles. The single symmetric key is used to both encrypt and decrypt the puzzles, and the server 204 maintains the secrecy of the symmetric key until broadcasting the symmetric key to unlock the encrypted puzzles.

In another embodiment, the server 204 shares encrypted puzzles with the puzzle proxy server 224 using a modified version of the Diffie-Hellman (DH) symmetric key exchange protocol. In the modified DH protocol, the server 204 generates an ephemeral public-private key pair with a limited lifetime that corresponds to how long a particular batch of encrypted puzzles should remain encrypted. The puzzle proxy server 224 generates another long-term public-private key pair that remains active for a longer period of time, and the puzzle proxy server 224 transmits the long-term public key to the server 204. The server 204 then uses the DH protocol to generate a secret symmetric encryption/decryption key using the long-term public key from the puzzle proxy serve r 224 and the ephemeral private key in the server 204. The server 204 uses the symmetric key to encrypt the puzzle data and transmit the encrypted puzzle data to the puzzle proxy server 224. Unlike the traditional DH protocol, the server 204 does not transmit the ephemeral public key to the puzzle proxy server 224 immediately. Instead, the server 204 holds the ephemeral public key until a later predetermined time when the server 204 is configured to release the previously encrypted puzzles to the outside world. The server 204 transmits the ephemeral public key 204 to the puzzle proxy server 224 at the later time, and the puzzle proxy server uses the ephemeral public key and the long-term private key for the puzzle proxy server 224 to regenerate the same secret symmetric key that the server 204 had previously used for encryption. The puzzle proxy server 224 then decrypts the encrypted puzzle data and makes the puzzle data available to the clients 240A-240N. The server 204 generates additional ephemeral public-private key pairs to repeat the process for additional batches of encrypted puzzles.

The server 204 optionally generates cryptographic signatures for puzzles and other metadata that are associated with the puzzles including the timestamp, validity, and difficulty data. The signatures can be generated for both encrypted and non-encrypted puzzle data. In one embodiment, the server 204 uses the private signing key 222 to sign the puzzles and the clients 240A-240N use the corresponding trusted public certificate 221 to verify the signatures. In another embodiment, the server 204 uses a symmetric key to generate message authentication codes (MACs) for the puzzles. The symmetric key is kept as a shared secret between the server 204 and the puzzle proxy server 224, and the puzzle proxy server 224 uses the symmetric key to verify the authenticity of the puzzles that are received from the server 204. The signature and the MAC are two different embodiments of authentication data that enable a receiving party to verify that the server 204 generated and signed the puzzles.

Figure 3:
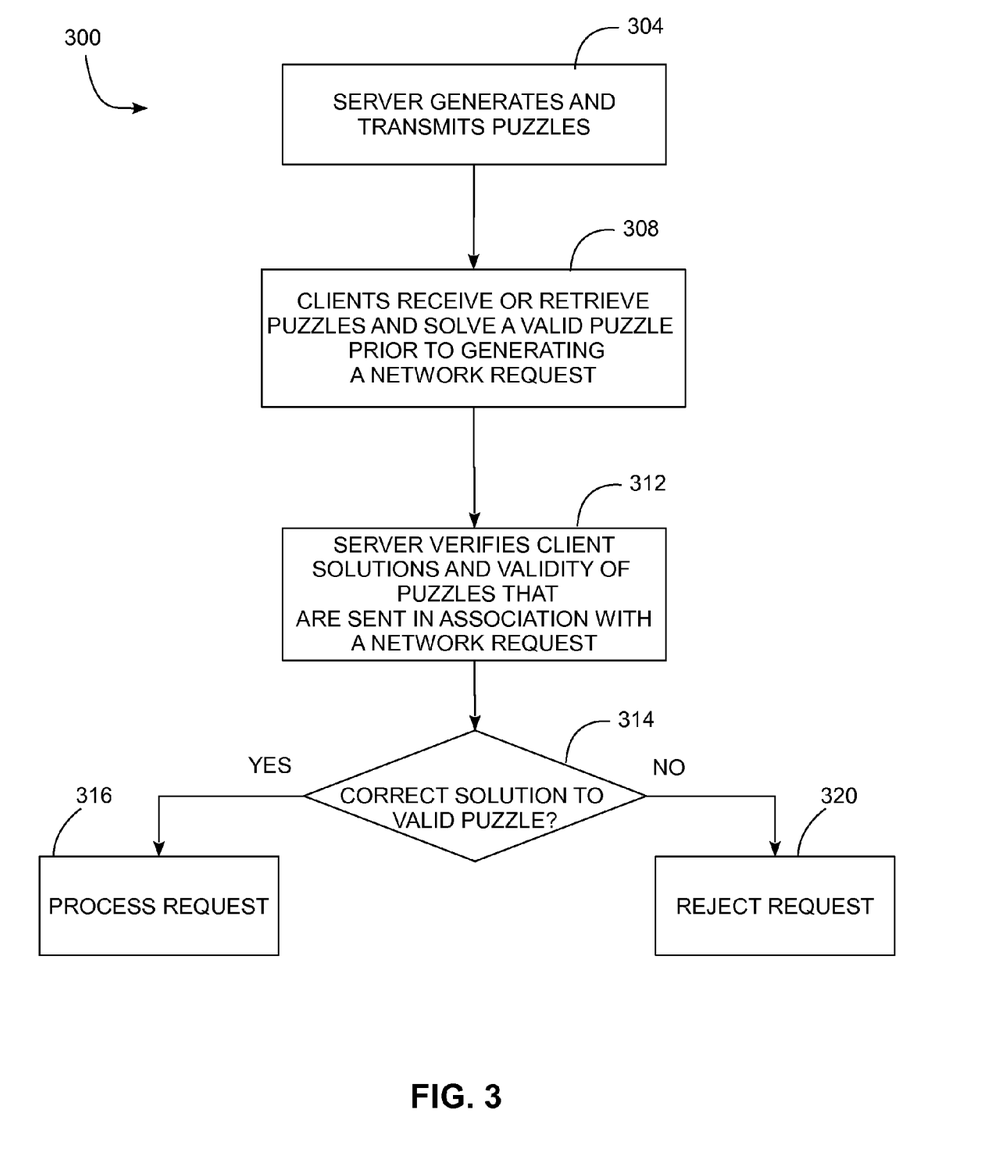
FIG. 3 is a block diagram of a process for generating and transmitting cryptographic puzzles to clients in a network system.

FIG. 3 depicts a process 300 that describes the operation of the system 200. In the description below, a reference to the process 300 performing a function or action refers to functions or actions that are performed by one or more control devices, such as digital controllers, which execute stored program instructions to perform the function or action.

Process 300 begins with generation and distribution of puzzles from the server 204 (block 304). Periodically or in an ad-hoc manner, the server 204 generates a puzzle x via PuzzleGen(.). The server broadcasts puzzle data including y=(x, timestamps, time_validity, puzzle difficulty) using a broadcast medium, such as the data network 236 in an embodiment where the data network 236 is a wireless broadcast network or other broadcast data network configuration. The timestamp field indicates the time at which the puzzle x becomes available to the clients, and the time_validity field indicates the length of time after timestamp for which the puzzle x remains valid. The difficulty field indicates a level of computational complexity required to solve the puzzle. In embodiments where the puzzles are transmitted to the clients as plain text, the timestamp field also corresponds to the time of transmission for the puzzle. In an embodiment where the puzzles are sent to the proxy server 224, the timestamp field corresponds to a time at which the puzzle proxy server 224 is permitted to transmit a puzzle to a client. In embodiments where the clients receive the puzzles in an encrypted format, the timestamp field corresponds to when the clients receive a key to decrypt the puzzles. After transmitting the puzzles, the server 204 monitors the lifetime of each puzzle based on the timestamp and time_validity data. When a puzzle expires without a solution before any of the clients 240A-240N supply a solution, the server 204 deletes the puzzle from the puzzle data 208, timeout data 210, and deletes any puzzle solution data from the puzzle solution cache 212. If a client transmits the puzzle solution after the puzzle expires, the server 204 does not recognize the solution as valid and rejects the solution, or the server 204 receives signed timestamp and validity data and ignores the answer in embodiments where the clients 240A-204N also transmit the original time stamp and time validity data to the server 204. In another embodiment, the server 204 sends the data y to the puzzle proxy server 224. The server 204 optionally generates a digital signature for the transmitted puzzle data y using, for example, a private signing key, to enable the clients 240A-240N and proxy server 224 to authenticate that the puzzles are sent from the server 204 instead of from an attacker.

Process 300 continues as one of the clients 240A-240N solves one of the valid puzzles that is either received from the server 204 or retrieved from the puzzle proxy server 224 (block 308). For example, in the system 200 the client 240A receives puzzle data y from the server 204 or from the puzzle proxy server 224. Once the client receives a puzzle y, the client authenticates the puzzle if an authentication mechanism is mandated by the server 204. In one embodiment, if the client obtains y from the puzzle proxy server 224, the client also authenticates that the puzzle proxy server 224 is a valid source for puzzle data before trusting the puzzle y. The integrity and authentication of these puzzles can be guaranteed via a secure channel between the client and puzzle proxy server 224. Alternatively, the client authenticates only the puzzle and validity period. This authentication method has the advantage that the client only needs information (e.g. a public key) for the server generating the puzzle rather than both the server generating the puzzle and the storage entity.

In the event that an attacker also acquires a secure channel to the puzzle proxy server 224, the puzzle proxy server 224 optionally sends secondary cryptographic puzzles to the attacker in order to reduce a maximum rate at which the attacker can effectively retrieve the puzzles 208. The attacker must solve the secondary puzzle from the puzzle proxy server 224 before retrieving another puzzle. Thus, the attacker is unable to retrieve the puzzles 208 quickly enough to exhaust the puzzles on the puzzle proxy server 224 before the server 204 generates additional puzzles.

The client 240A checks whether the puzzle y is still valid within the designated validity time interval (e.g., a mobile client obtains puzzles from the puzzle proxy server 224 and checks whether the validity time interval has expired). If the client 240A receives an encrypted puzzle y', then the client 240A buffers y' and waits until the activation time for y'. If the client 240A receives k' on time, then the client 240A decrypts y←D_k'(y') and proceeds as usual, where D denotes the decryption function. Otherwise, the client erases y' from its buffer.

If the client 240A identifies that the puzzle data y correspond to a valid puzzle before the validity time interval for the puzzle expires, then the client 240A generates a solution x' for the puzzle transmitted in y via PuzzleSolve(.). If the client 240A finds the correct solution x' for y before the puzzle y expires, then the client 240A sends a request to the server 204 Request={Service, (y, x')} along with the signature sig of Request. This request may include proper key exchange mechanisms to establish a secure channel for future communication with the server.

As described above, the server 204 optionally encrypts the puzzle and associated timestamp, validity, and difficulty data y as y'←(E_k(x), activation_time, validity, difficulty), where E denotes an encryption function using key k. The key k is a symmetric key for symmetric-key block cipher such as AES or a public key in an asymmetric encryption technique such as RSA. The server transmits a decryption key k' to activate the puzzle y at a predetermined activation time. The server 204 generates the validity_time data for the puzzle to include a valid time range beginning at the time that the decryption key is transmitted to maintain the validity of the puzzle data y for the predetermined length of time. In one embodiment, the server 204 uses a Transparent, Extensible Session-Layer Architecture (TESLA)-type scheme to authenticate the private key k', as the use of this private key also relies on a delayed key disclosure strategy. Note that the validity time is set with reference to the prospective activation time to enable the puzzle to be valid for a useful amount of time in the system 200. For example, the puzzle activation time is not set to be after or very shortly before the expiration of the validity time, which would render the cryptographic puzzle invalid (i.e., obsolete).

Once the client generates a solution for a valid puzzle, the client transmits a request for services to the server and the server verifies the puzzle solution and provides the service if the puzzle solution is a valid solution to a valid puzzle (block 312). In the process 300, the client, such as the client 240A, does not communicate with the server 204 until after the client 240A generates the solution to the puzzle and transmits the solution, an identifier for the particular puzzle that was solved, and a request for service to the server 204. Thus, the server 204 is not required to generate and transmit puzzles in direct response to client requests, but the server 204 generates the puzzles during periods of low system utilization and transmits the puzzles to the clients as needed. As used herein, the terms "level of utilization" or more simply "utilization" as applied to a computing device refer to the relative usage of resources in the computing device to perform tasks compared to the maximum available resources in the computing device. In a computing device such as the server 204, the resources include, but are not necessarily limited to, processing power, memory, input-output bandwidth to various data storage devices, and bandwidth for communication with the data network 236. Various hardware and software techniques for monitoring the level of utilization in a computing device are known to the art and are not described in more detail herein.

For the generation of puzzles, the server 204 monitors the level of utilization of one or more processors the usage of internal memory to identify opportunities for the generation of puzzles during periods of low utilization. For example, if the level of utilization for one or more processors in the server 204 falls below a predetermined threshold, then the server uses spare computational capacity in the low-utilization processors to generate additional cryptographic puzzles. When the server 204 is under a higher utilization level, the clients 240A-240N solve previously generated puzzles to enable the server 204 to devote more computational resources to servicing valid client requests instead of having to generate a new puzzle for each client request during periods of high utilization. The server 204 optionally encrypts cryptographic puzzles for later decryption by the clients to ensure that sufficient cryptographic puzzles are available to enable legitimate clients to make requests while reducing or eliminating invalid requests that are part of denial of service attacks.

In one embodiment of the system 200, if the server 204 verifies that the puzzle is valid (block 314), then the server 204 processes the request (block 316). As described above, the server 204 verifies the puzzle solution either using the stored valid puzzles 208 or identifying the solution in the cached puzzle solution data 212. For example, to validate a puzzle based on a cryptographic hash, the server 204 applies the hash function to the solution that is included in the request and verifies that the hashed value matches the original hashed value stored with the puzzle data 208. The application of the hash function is typically much less computationally intensive than the amount of work that the client spends to reverse the hash function using the pre-image bits and a brute-force hash reversal technique. In an embodiment where the server 204 stored cached solution data 212, the server 204 verifies the validity of the solution by directly comparing the solution to the cached solution data 212. The request data from the client includes the original puzzle or data corresponding to the original puzzle to enable the server 204 to identify the puzzle that the client purports to solve.

The embodiment of the server 204 that is depicted in FIG. 2 stores the puzzle data 208, timestamp data 216 and optionally the puzzle solutions 212 in memory. While this enables high efficiency for identifying if a puzzle solution from a client is valid, a large number of valid puzzles also require a relatively large amount of memory. In an alternative embodiment, each request from the clients 240A-240N includes not only the answer to the puzzle, but the puzzle data y that the server 204 generated including the puzzle, original puzzle timestamp, and validity time. The request also includes a cryptographic signature that the server 204 applied to the data y to enable the server 204 to verify that the puzzle, timestamp, and validity data were actually generated by the server 204 and not by an attacker. The server 204 checks whether a request (Request) transmitted from a client meets the freshness condition based on the timestamp and time_validity information given in y. If Request is fresh then the server verifies the correctness of the puzzle via PuzzleVer(.) as described in Section 1. As described above, verification of the puzzle is contingent upon the server 204 using a private key stored in the server memory to verify the authenticity of the data y in the request in addition to verifying that the client generated the correct solution to the puzzle. The server 204 does not need to store the puzzle data in an internal memory in this embodiment and uses the cryptographically signed timestamp information to ensure that client requests are only granted if the puzzle has not yet expired.

The server 204 invalidates the puzzle solution after a single client has used the puzzle and solution to prevent replay attacks using a single solution to a puzzle for multiple network requests. To invalidate a puzzle after receiving a correct solution and before the puzzle expires, the server 204 deletes the data for the solved puzzle from the stored puzzle data 208, puzzle timestamp and timeout data 210, and deletes the solution from the optional puzzle solution cache 212. Another request that includes the correct solution to the puzzle will be invalid since the server 204 no longer recognizes the puzzle as valid. In some embodiments, the server 204 verifies a digital signature sig associated with the request after confirming the validity of the cryptographic puzzle solution and before processing the request. If the puzzle solution data received from the client does not correspond to a correct solution to a valid puzzle (block 314), then the server 204 rejects the network request (block 320).

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:
1. A method for mitigation of denial of service attacks in a network comprising:
generating with a processor in a server computing device a first plurality of puzzles;
transmitting with the processor and a network device in the server computing device the first plurality of puzzles through a data network to a plurality of client computing devices;
generating with the processor in the server computing device a second plurality of puzzles;
generating with the processor in the server computing device a plurality of encrypted puzzles from the second plurality of puzzles using a first cryptographic key, the plurality of encrypted puzzles being unsolvable by the plurality of client computing devices while encrypted;
transmitting with the processor and the network device in the server computing device the encrypted plurality of puzzles through the data network to the plurality of client computing device at a first time;
receiving with the processor and the network device in the server computing device a first request from one client computing device in the plurality of client computing devices that includes a first solution to one puzzle in the first plurality of puzzles, the request from the one client computing device being received without a communication from the one client computing device requesting a puzzle;
verifying with the processor in the server computing device correctness of the first solution to the one puzzle in the first plurality of puzzles from the one client computing device with reference to data corresponding to the one puzzle in the first plurality of puzzles stored in a memory in the server computing device;
continuing to process the first request with the processor in the server computing device only in response to verification that the first solution to the one puzzle in the first plurality of puzzles from the one client computing device is correct;
transmitting with the processor and the network device in the server computing device a second cryptographic key through the data network to the plurality of client computing devices at a second time, the second time being later than the first time, the second cryptographic key enabling the plurality of client computing devices to decrypt the encrypted plurality of puzzles and to generate solutions for the second plurality of puzzles after the second time;
receiving with the processor and the network device in the server computing device a second request from the one client computing device in the plurality of client computing devices that includes a solution to one puzzle in the second plurality of puzzles, the second request from the one client computing device being received without a communication from the one client computing device requesting a puzzle and only after the transmitting of the second cryptographic key at the second time;
verifying with the processor in the server computing device correctness of the solution to the one puzzle in the second plurality of puzzles from the one client computing device with reference to data corresponding to the one puzzle in the second plurality of puzzles stored in a memory in the server computing device; and
continuing to process the second request with the processor in the server computing device only in response to verification that the solution to the one puzzle in the second plurality of puzzles from the one client computing device is correct.

2. The method of claim 1, the transmission of the first plurality of puzzles further comprising:
transmitting with the processor and the network device in the server computing device the first plurality of puzzles through a broadcast network to enable the plurality of client computing devices that are communicatively connected to the broadcast network to receive the first plurality of puzzles.

3. The method of claim 1, the transmission of the first plurality of puzzles further comprising:
transmitting with the processor and the network device in the server computing device the first plurality of puzzles through the data network to a puzzle proxy server to enable the plurality of client computing devices to retrieve puzzles in the first plurality of puzzles from the puzzle proxy server.

4. The method of claim 1, the generation of the first plurality of puzzles and verification of the solution further comprising:
generating with the processor in the server computing device a timestamp corresponding to a time of transmission for one puzzle in the first plurality of puzzles; and
deleting with the processor the data corresponding to the one puzzle from the memory after expiration of a predetermined validity time from the timestamp to enable the processor to reject subsequent requests that include the correct solution to the one puzzle received from client computing devices in the plurality of client computing devices.

5. The method of claim 1 further comprising:
deleting with the processor in the server computing device the data corresponding to the one puzzle in the first plurality of puzzles from the memory in response to verifying the correct solution to the one puzzle in the request; and
rejecting with the processor in the server computing device a subsequent request that includes the correct solution to the one puzzle received from any client computing device in the plurality of client computing devices.

6. The method of claim 1 wherein the first cryptographic key is a public key and the second cryptographic key is a private key, the private key being different than the public key.

7. The method of claim 1 wherein the first cryptographic key is the second cryptographic key and the first and second cryptographic keys are a symmetric cryptographic key.

8. The method of claim 1 further comprising:
generating with the processor in the server computing device a plurality of digital signatures, each digital signature in the plurality of digital signatures corresponding to one puzzle in the first plurality of puzzles; and
transmitting with the processor and the network device in the server computing device the plurality of digital signatures in association with the first plurality of puzzles to enable the plurality of client computing devices to authenticate that the first plurality of puzzles are generated by the server computing device.

9. The method of claim 1 further comprising:
identifying with the processor in the server computing device a level of utilization for the server computing device; and
generating the first plurality of puzzles in response to the level of utilization being below a predetermined threshold.

10. A server computing device configured to mitigate denial of service attacks in a network comprising:
a memory;
a network device configured to send and receive data with a plurality of external computing systems through a data network; and
a processor operatively connected to the memory and the network device, the processor being configured to:
generate a first plurality of puzzles;
transmit the first plurality of puzzles through the data network to a plurality of client computing devices;
generate a second plurality of puzzles;
generate a plurality of encrypted puzzles from the second plurality of puzzles using a first cryptographic key, the plurality of encrypted puzzles being unsolvable by the plurality of client computing devices while encrypted;
transmit the encrypted plurality of puzzles through the data network to the plurality of client computing device at a first time;
receive a first request from one client computing device in the plurality of client computing devices that includes a first solution to one puzzle in the first plurality of puzzles, the first request from the one client computing device being received without a communication from the one client computing device to request a puzzle;
verify correctness of the first solution to the one puzzle in the first plurality of puzzles from the one client computing device with reference to data corresponding to the one puzzle in the first plurality of puzzles stored in the memory;
continue to process the first request only in response to verification that the first solution from the one client computing device is correct;
transmit a second cryptographic key through the data network to the plurality of client computing devices at a second time, the second time being later than the first time, the second cryptographic key enabling the plurality of client computing devices to decrypt the encrypted plurality of puzzles and generate solutions for the second plurality of puzzles after the second time;
receive a second request from the one client computing device in the plurality of client computing devices that includes a second solution to one puzzle in the second plurality of puzzles, the second request from the one client computing device being received without a communication from the one client computing device to request a puzzle and only after the transmission of the second cryptographic key at the second time;
verify correctness of the second solution to the one puzzle in the second plurality of puzzles from the one client computing device with reference to data corresponding to the one puzzle in the second plurality of puzzles stored in the memory; and
continue to process the second request only in response to verification that the second solution to the one puzzle in the second plurality of puzzles from the one client computing device is correct.

11. The server of claim 10, the processor being further configured to:
transmit the first plurality of puzzles through a broadcast network to enable the plurality of client computing devices that are communicatively connected to the broadcast network to receive the first plurality of puzzles.

12. The server of claim 10, the processor being further configured to:

transmit the first plurality of puzzles through the data network to a puzzle proxy server to enable the plurality of client computing devices to retrieve puzzles in the first plurality of puzzles from the puzzle proxy server.

13. The server of claim 10, the processor being further configured to:

generate a timestamp corresponding to a time of transmission for one puzzle in the first plurality of puzzles; and delete the data corresponding to the one puzzle from the memory after expiration of a predetermined validity time from the timestamp to enable the processor to reject subsequent requests from the plurality of client computing devices that include the correct solution to the one puzzle.

14. The server of claim 10, the processor being further configured to:

delete the data corresponding to the one puzzle in the first plurality of puzzles from the memory in response to verification of the correct solution to the one puzzle in the request received from the client computing device; and reject a subsequent request including the correct solution to the one puzzle from any client computing device in the plurality of client computing devices.

15. The server of claim 10 wherein the first cryptographic key is a public key and the second cryptographic key is a private key, the private key being different than the public key.

16. The server of claim 10 wherein the first cryptographic key is the second cryptographic key and the first and second cryptographic keys are a symmetric cryptographic key.

17. The server of claim 10, the processor being further configured to:

generate a plurality of digital signatures, each digital signature in the plurality of digital signatures corresponding to one puzzle in the first plurality of puzzles; and transmit the plurality of digital signatures in association with the first plurality of puzzles to enable the plurality of client computing devices to authenticate that the first plurality of puzzles are generated by the server computing device.

18. The server of claim 10, the processor being further configured to:

identify a level of utilization for the server computing device; and generate the first plurality of puzzles in response to the level of utilization being below a predetermined threshold.

* * * * *